Jan. 22, 1963  G. ALLIMANN  3,074,702
ROTARY DRUM TYPE CUTTING DEVICE FOR MACHINES USED
IN MINES, QUARRIES AND WORK-SITES
Filed April 7, 1959  3 Sheets-Sheet 1

INVENTOR
GEORGES ALLIMANN

BY  Karl W. Flocks
ATTORNEY

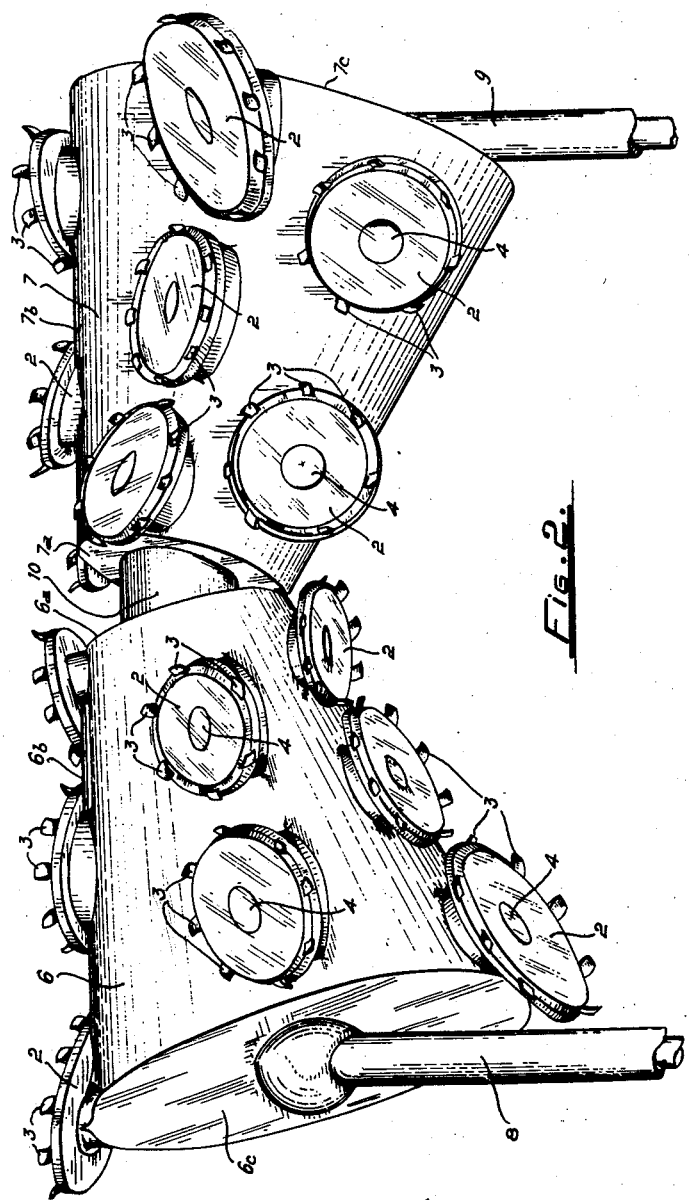

INVENTOR
GEORGES ALLIMANN

By

ATTORNEY

3,074,702
ROTARY DRUM TYPE CUTTING DEVICE FOR MACHINES USED IN MINES, QUARRIES AND WORK-SITES
Georges Allimann, Mulhouse, France, assignor to Ateliers de Carspach, Carspach (Haut-Rhin), France, a French company
Filed Apr. 7, 1959, Ser. No. 804,739
Claims priority, application France Apr. 10, 1958
3 Claims. (Cl. 262—26)

The present invention has for its object a mechanical cutting device for machines used in mines, quarries or work-sites, and particularly adapted to coal-cutting machines or continuously-operating mining machines.

A type of drilling machine is disclosed in U.S. Patent 2,976,027 to the applicant. Said drilling machine comprises a rotary head and on said rotary head, a plurality of rotary drilling plates provided on their top face with picks inclined toward the direction of rotation of said plates which are set at an angle with a plane perpendicular to the longitudinal axis of the machine.

The rotary head of this type of machines has, in operation, its longitudinal or rotation axis perpendicular to the stope face.

The applicant has found out that such inclined plates could be applied with an unexpected result to another type of drilling machines called "continuously-front-operated machines" comprising a rotary body the axis of rotation of which or longitudinal axis is set, in operation, parallel to the cutting line.

The result obtained consists in a non seizing up of the cutters which frequently occurs with machines of this type.

The presence of protruding plates having their own movement of rotation may have aggravated this seizing up to the cutters but, in the contrary, has proved so improve the working of the structure.

A continuously-front-operated mining machine according to the invention comprises a rotating body constantly facing the face of the stope, a plurality of rotary plates distributed on said body, said plates being provided with picks inclined towards the direction of rotation of said plates and being set at an angle with a plane comprising the longitudinal axis of the body.

According to one embodiment, the body is a cylindrical drum.

According to another embodiment the body comprises two truncated cones providing a rectilinear cutting line.

Other features and advantages of the present invention will become clear on reading the following description, with reference to the accompanying drawings given merely by way of an explanation and showing three embodiments according to the invention. In these drawings:

FIGURE 2 is a top view of a device in accordance with the invention having its drum comprising two truncated cones forming a rectilinear cutting line;

Figure 1:
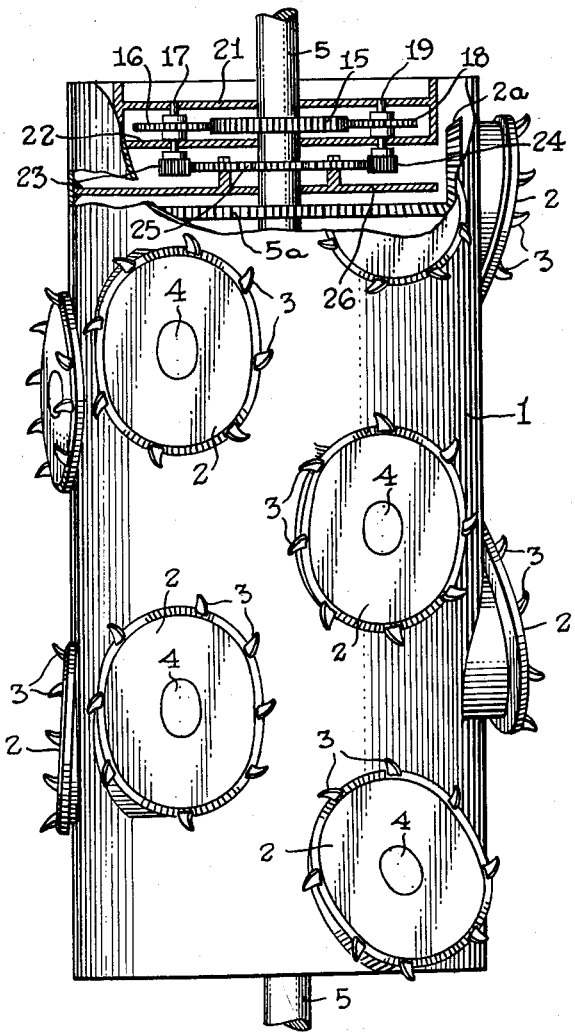
FIGURE 1 is an elevational view, partly broken away, of a cylindrical drum machine in accordance with the present invention.

In the embodiment shown in FIGURE 1, a rotary body or cylindrical drum 1 is adapted to be mounted on a side-operating type of coal cutter. Rotating plates 2, carrying picks 3, are distributed on the surface of this drum. These plates are inclined at an angle to a plane P comprising the longitudinal axis C—D of the drum. The axes of these plates are inclined twice relative to a line A—B perpendicular to this plane.

The axis 4 of each plate is first inclined at an angle $\alpha$ to the aforesaid perpendicular line, then it forms an angle $\beta$ with a line A1—B corresponding to the first inclination of the axis to the perpendicular A—B. The final inclination of the axis 4 to the plane P is thus obtained.

Owing to the rotation ($f$) of the drum on its own axis, to the rotation ($f_1$) of the plates and to the angle at which the plates are inclined to the stope face, the picks 3 can each in their turn strike into the material to be cut and be immediately withdrawn therefrom. Owing to both rotations ($f$) and ($f_1$), the picks 3 of the plates strike the face of the rock R along markings T which constitute portions of a cycloid, following one another along strips E of the stope face, which conforms substantially to the shape of a portion of the side surface of the cylindrical drum. The direction of rotation of the plates ($f_1$) and that of the drum ($f$) are unimportant, the sole important requirement being relative to the facing of the cutting edges of the picks 3 in the direction of the rotation of the plates. The drum of the machine is rotated about its axis C—D coincident with the axis of shaft 5, through a suitable transmission connecting this shaft to the driving motor of the machine on which the cutting device is mounted. The drive mechanism may be of a construction known in the prior art. Suitable mechanisms are shown in Gardner Patent No. 473,570, Gilthorpe Patent No. 1,391,626 and McFadden Patent No. 1,419,068. The construction utilized in Gilthorpe Patent No. 1,391,626 is shown in FIG. 1 of the drawing.

As shown in FIG. 1, the drum 1 is rotated through a gear train driven from the drive shaft 5, there being secured to shaft 5 a gear 15 in mesh with gears 16 and 18 carried on shafts 17 and 19. Shafts 17 and 19 are journaled in two walls 21 and 22 forming a part of a fixed frame work; the shafts 17 and 19 carry at their lower ends pinions 23 and 24 which are in mesh with a ring gear 25 through which freely passes the shaft 5 and which is secured to a web 26 forming a part of the drum 1. Rotation of shaft 5 causes the shafts 17 and 19 to rotate, and pinions 23 and 24 attached thereto rotate ring gear 25 and body 1.

Figure 1A:
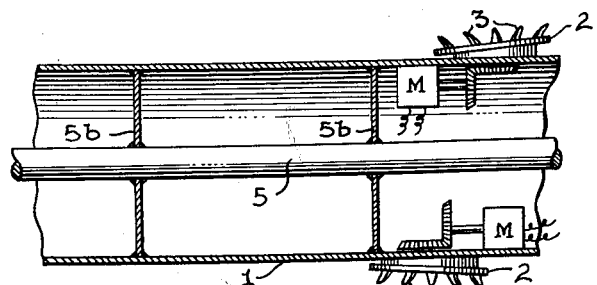
FIGURE 1A is a cross sectional view of another embodiment of a cylindrical drum machine in accordance with the present invention.
Figure 3:
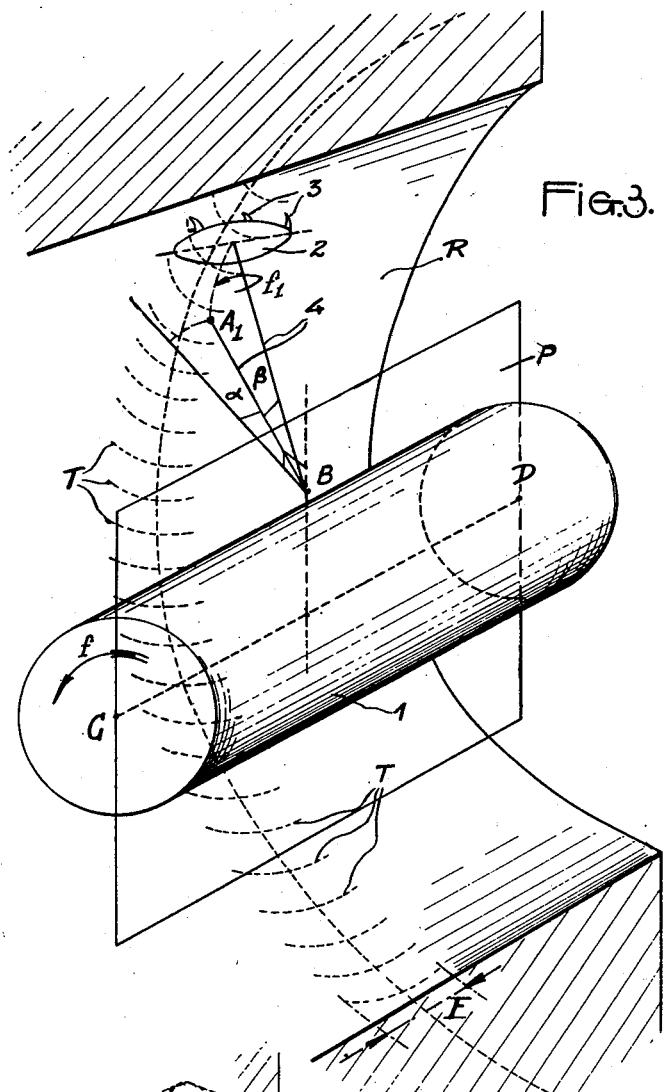
FIGURE 3 is a diagram illustrating the cutting operation of the device and showing the position of the axes of each rotating pick-carrying plate relative to the longitudinal axis of the rotary drum shown in FIGURE 1.

The drive of the plates 2 is effected within the rotary drum, e.g. by means of gear means (such as the ring gear 5a keyed on the shaft 5) meshing with further gear means (such as the gear 2a formed on the sides of the plates 2). The plates can also be driven by means of motors housed in the drum; such a construction is shown in FIG. 1A where the drum 1 is fixedly connected with the shaft 5 by the web members 5B, and the aforementioned motors M are provided for driving the plates 2.

Figure 4:
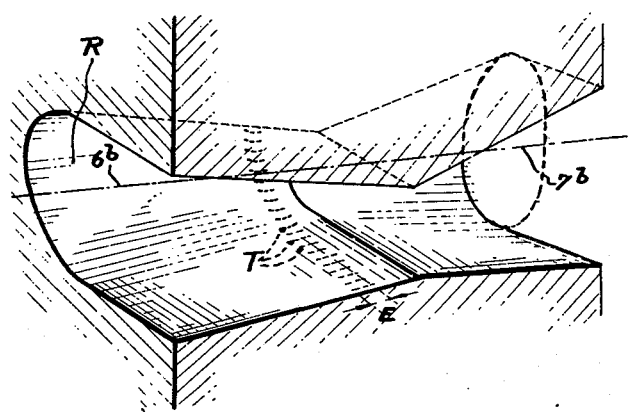
FIGURE 4 is a diagram showing the manner in which the cutting operation is performed using the device illustrated in FIGURE 2.

In the embodiment shown in FIGURE 2, the drum comprises two truncated cones 6 and 7 facing each other by their small bases 6a, 7a. Moreover, a generatrix 6b of the truncated cone 6 is aligned with a generatrix 7b of the truncated cone 7, so that both truncated cones provide a rectilinear cutting line. Both truncated cones 6 and 7 being thus arranged, the broad bases thereof 6c and 7c define a dead angle or free space with the side walls of the cutting hole (FIGURE 4). Owing to this inclination of the broad bases 6c, 7c of both cones, two drum supporting arms 8 and 9 can be adapted to these broad bases and the arrangement can be used for operational and torque-transmitting purposes.

For reasons already stated, these transmission means and these motors are not described in detail nor shown in the drawings.

The drum shown in FIGURE 2 is adapted to be used on a coal-cutter or a continuously-operated mining machine of the frontal type. As is the drum shown in FIGURE 1, it is provided with rotating plates 2 carrying picks 3, which are inclined in the direction of rotation of said plates. These plates are inclined at an angle to the stope face R.

The plates 2 are driven in a similar way to that described in connection with FIGURE 1, the driving means being located within the drum and being operated through gears keyed on the shafts and meshing with other gears formed in the sides of the plates. These plates can also be driven by means of motors housed in the drum.

In the emobdiment shown in FIGURE 2, the picks 3 provided on the plates 2 strike the face of the stope face R along markings T which are portions of a cycloid, following one another along paths E of the stope face which substantially conforms to the shape of a portion of the side surface of a continuously-operated mining machine (FIGURE 4).

The plates 2 can be distributed on the surface of said truncated cones. The plates located at the ends of the cones extend beyond the edges thereof to provide for disengagement.

It is to be understood that this description has been given by way of explanation without any intent of limiting the invention and that numerous changes can be made therein without falling outside its scope.

I claim:
1. In a continuously-front-operated mining machine having a longitudinally extending rotary body adapted to have its axis disposed generally along the face of a stope and rotatable on said axis, a plurality of rotary plates supported for rotational movement substantially at the surface of said rotary body and distributed substantially in overlapping relationship axially along said rotary body, the axis of each said rotary plate having a double inclination relative to a line perpendicular to a plane through said body axis, means for rotating said plates on their axes as said rotary body rotates on its axis, said plates having picks thereon having cutting edges facing toward the direction of rotation of said plates, said picks being radially positioned on said plates so that the contacts of the picks of one said plate on the mine face are substantially in overlapping relationship with the contacts of the picks of an adjacent said plate.

2. A continuously-front-operated mining machine, according to claim 1 wherein the body is a cylindrical rotary drum.

3. A continuously-front-operated mining machine according to claim 1 wherein the body comprises two truncated cones, providing a rectilinear cutting line.

References Cited in the file of this patent
UNITED STATES PATENTS

| | | |
|---|---|---|
| 2,677,536 | Gleeson | May 4, 1954 |
| 2,832,579 | Barrett | Apr. 29, 1958 |

FOREIGN PATENTS

| | | |
|---|---|---|
| 1,129,571 | France | Sept. 10, 1956 |